(12) United States Patent
Nagano et al.

(10) Patent No.: US 8,048,491 B2
(45) Date of Patent: Nov. 1, 2011

(54) MULTILAYER COATING FILM-FORMING METHOD

(75) Inventors: Hiroyuki Nagano, Aichi (JP); Hironori Tonomura, Aichi (JP); Yasushi Nakao, Aichi (JP); Yoshizumi Matsuno, Aichi (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 817 days.

(21) Appl. No.: 12/149,042

(22) Filed: Apr. 25, 2008

(65) Prior Publication Data

US 2008/0268256 A1    Oct. 30, 2008

(30) Foreign Application Priority Data

Apr. 27, 2007   (JP) ................. 2007-118778

(51) Int. Cl.
*B05D 1/36* (2006.01)
*B05D 3/02* (2006.01)
*C08G 63/42* (2006.01)

(52) U.S. Cl. .............. 427/407.1; 427/386; 427/410; 427/412.3; 528/297

(58) Field of Classification Search .......... 427/402, 427/407.1, 384, 385.5, 386, 388.1, 409, 410, 427/412.3
See application file for complete search history.

(56) References Cited

U.S. PATENT DOCUMENTS

| | | | | | |
|---|---|---|---|---|---|
| 4,755,581 | A | * | 7/1988 | Blackburn et al. | 528/93 |
| 5,902,644 | A | * | 5/1999 | Okumura et al. | 427/386 |
| 5,989,642 | A | * | 11/1999 | Singer et al. | 427/407.1 |

FOREIGN PATENT DOCUMENTS

| | | |
|---|---|---|
| EP | 1 050 346 A1 | 11/2000 |
| JP | 7-133340 | 5/1995 |

* cited by examiner

*Primary Examiner* — Dah-Wei Yuan
*Assistant Examiner* — Jose Hernandez-Diaz
(74) *Attorney, Agent, or Firm* — Wenderoth, Lind & Ponack, L.L.P.

(57) ABSTRACT

This invention provides a multilayer coating film-forming method by 2-coat-1-bake coating using a clear coat paint comprising a carboxyl group- and/or cyclic acid anhydride group-containing compound and polyepoxide, in which the coating workability and electrostatic coatability are improved by blending a specific organic solvent in the clear coat paint.

5 Claims, No Drawings

MULTILAYER COATING FILM-FORMING METHOD

TECHNICAL FIELD

This invention relates to a multilayer coating film-forming method, which comprises forming on a coating object a base coating film and clear coating film by 2-coat-1-bake system.

BACKGROUND ART

In top coat paint application onto automobiles, 2-coat-1-bake system has been widely used. This coating method comprises first applying a base coat paint to form a base coating film, applying onto the uncured base coating film a clear coat paint to form a clear coating film, and thereafter curing by heating the base coating film and clear coating film simultaneously. Thus obtained multilayer coating film excels in finished appearance such as gloss and depth.

Improvement in acid resistance of coating film has recently been in demand, and for meeting this demand, for example JP Hei 7 (1995)-133340A disclosed as a clear coat paint to be applied by 2-coat-1-bake system, a curable resin composition comprising polyepoxide, carboxyl group- and/or cyclic acid anhydride group-containing curing agent and a specific latent curing catalyst. Using this paint, coating film excelling in acid resistance can be obtained. When this clear coat paint is used in 2-coat-1-bake coating, however, there are such problems as that coating workability such as foaming resistance, sagging resistance and the like becomes insufficient in the occasions of thick textured coating, and that electrostatic coatability may become defective because high polarity of onium salt compound, which is among the latent curing catalyst used in the clear coat paint, lowers volume specific resistance of the paint.

DISCLOSURE OF THE INVENTION

The object of the present invention is to provide a method for forming multilayer coating film excelling in coating workability such as foaming resistance, sagging resistance and the like and also in electrostatic coatability, by 2-coat-1-bake coating to form on a coating object a base coating film and clear coating film using a clear coat paint comprising carboxyl group- and/or cyclic acid anhydride group-containing compound and polyepoxide.

We have engaged in concentrative studies for accomplishing the above object to now discover that the object could be met by blending an organic solvent having a boiling point within a specific range and a solubility in water within a specific range, with a clear coat paint comprising carboxyl group- and/or cyclic acid anhydride group-containing compound and polyepoxide. The present invention is whereupon completed.

Thus, the invention provides a multilayer coating film-forming method which comprises applying onto a coating object a base coat paint to form a base coating film, applying onto the formed uncured base coating film a clear coat paint to form a clear coating film, and heating the base coating film and clear coating film to cure the two films simultaneously, characterized in that the clear coat paint comprises a carboxyl group- and/or cyclic acid anhydride group-containing compound (A), polyepoxide (B) and an organic solvent (C) having a boiling point within a range of 240° C.-300° C. and a solubility in water not higher than 20 and that the content of the organic solvent (C) is, based on the combined amount of the carboxyl group- and/or cyclic acid anhydride group-containing compound (A) and polyepoxide (B), 2-20 mass %.

According to the multilayer coating film-forming method of the present invention, thermal flow property of the clear coating film in the curing procedure is improved because the clear coat paint contains an organic solvent having a high boiling point within a specific range, to improve foaming resistance of the coating film, and also favorable sagging resistance of the coating film can be maintained by the use of the clear coat paint containing the organic solvent of an amount within a specific range. With clear coat paint, which contains as the resin component a carboxyl group- and/or cyclic acid anhydride group-containing compound and polyepoxide, generally high polarity onium salt compound or the like are used as the curing catalyst. Hence it is necessary to prevent further lowering of volume specific resistance of the paint, from the viewpoint of electrostatic coatability. Whereas, the clear coat paint used in the present invention contains the relatively low polarity organic solvent having a low solubility in water and preferably also contains a latent curing catalyst constituted of tertiary amine and acidic phosphoric acid ester, whereby lowering in volume specific resistance can be prevented, and the clear paint exhibits favorable electrostatic coatability.

Thus, according to the multilayer coating film-forming method of the present invention, such conspicuous effect can be achieved that multilayer coating film exhibiting excellent finished appearance and acid resistance can be formed with high working efficiency and stability, by 2-coat-1-bake coating method.

Hereinafter the multilayer coating film-forming method (which may be hereafter referred to as "the present method") is explained in further details.

DETAILED EXPLANATION OF THE INVENTION

Clear Coat Paint

The clear coat paint used in the present method is a paint comprising as the coating film-forming resin component, a carboxyl group- and/or cyclic acid anhydride group-containing compound (A) and polyepoxide (B); and an organic solvent (C) having a boiling point within a range of 240° C.-300° C. and a solubility in water not higher than 20, the content of the organic solvent (C) being 2-20 mass %, based on the combined amount of the carboxyl group- and/or cyclic acid anhydride group-containing compound (A) and polyepoxide (B).

Carboxyl Group- and/or Cyclic Acid Anhydride Group-Containing Compound (A)

The carboxyl group- and/or cyclic acid anhydride group-containing compound (A), which is used as a coating film-forming resin component in the clear coat paint according to the present method, encompasses polycarboxylic acid compound (A-1) containing at least two carboxyl groups per molecule, cyclic acid anhydride compound (A-2) containing at least one cyclic acid anhydride group per molecule, and carboxyl group-containing cyclic acid anhydride compound (A-3) containing at least one each of carboxyl group and cyclic acid anhydride group per molecule.

Examples of the polycarboxylic acid compound (A-1) include low molecular weight compounds such as tetrahydrophthalic acid, hexahydrophthalic acid and trimellitic acid; and polycarboxylic acid resins of vinyl type, polyester type and the like.

Of those, examples of vinyl type polycarboxylic acid resin include (co)polymers formed by radical polymerization of carboxyl group-containing vinyl monomer and, where necessary, other vinyl monomer(s); (co)polymers formed by radical polymerization of acid anhydride group-containing vinyl monomer and, where necessary, other vinyl monomer(s), which are then half-esterified with alcohol (e.g., acetol, allyl alcohol, propargyl alcohol or methanol), here the half-esterification being a reaction to add monohydric alcohol to the acid anhydride group to cause the latter's ring-opening, whereby forming a group formed of carboxyl group and carboxylic acid ester group, which group hereinafter may be referred to simply as half-ester group; (co)-polymers formed by radical polymerization of half-ester group-containing vinyl monomer and, where necessary, other vinyl monomer(s); and hydroxyl group-containing (co)polymers formed by radical (co)polymerization of hydroxyl group-containing vinyl monomer as the essential component and, where necessary, other vinyl monomer(s), which are further half-esterified with acid anhydride compound (e.g., succinic anhydride).

As half-ester group-containing vinyl monomer, for example, a compound obtained upon half-esterifying acid anhydride group of acid anhydride group-containing vinyl monomer and a compound obtained by adding acid anhydride to hydroxyl group-containing vinyl monomer by half-esterification can be named. Specific examples of the compound obtained by half-esterification of acid anhydride group of acid anhydride group-containing vinyl monomer include esterification products of acid anhydride group-containing vinyl monomers such as maleic anhydride, itaconic anhydride or the like, with alcohols (e.g., acetol, allyl alcohol, propargyl alcohol or methanol). Specific examples of the compound obtained by adding acid anhydride to hydroxyl group-containing vinyl monomer by half-esterification include those compounds obtained by adding such acid anhydride as phthalic anhydride, hexahydrophthalic anhydride or the like to the hydroxyl group-containing vinyl monomers as exemplified in the following, by half-esterification.

Half-esterification can be effected either before or after the copolymerization reaction. As monohydric alcohols useful for the half-esterification, low molecular weight monohydric alcohols, for example, methanol, ethanol, isopropanol, tert-butanol, isobutanol, ethylene glycol monomethyl ether and ethylene glycol monoethyl ether can be named. The half-esterification reaction can be carried out following per se accepted method, for example, at temperatures ranging from room temperature to around 80° C., using tertiary amine as catalyst, where necessary.

Examples of carboxyl group-containing vinyl monomer useful for the preparation of vinyl type polycarboxylic acid resin include (meth)acrylic acid and adducts of hydroxyl group-containing vinyl monomer with Himic acid® anhydride; and examples of acid anhydride group-containing vinyl monomer include itaconic anhydride, maleic anhydride and the like.

As other vinyl monomer(s) useful in the preparation of vinyl type polycarboxylic acid resin, for example, hydroxyl group-containing vinyl monomer; (meth)acrylic acid esters; vinyl ether and allyl ether; olefin compounds and diene compounds; hydrocarbon ring-containing vinyl monomers; and nitrogen-containing vinyl monomers can be named.

Examples of the hydroxyl group-containing vinyl monomer include $C_{2-8}$ hydroxyalkyl esters of acrylic acid or methacrylic acid such as 2-hydroxyethyl (meth)acrylate, 3-hydroxypropyl (meth)acrylate, 4-hydroxybutyl (meth)acrylate and the like; monoesters of polyether polyols such as polyethylene glycol, polypropylene glycol, polybutylene glycol and the like with unsaturated carboxylic acids such as (meth) acrylic acid; monoethers of polyether polyols such as polyethylene glycol, polypropylene glycol, polybutylene glycol and the like with hydroxyl group-containing unsaturated monomers such as 2-hydroxyethyl (meth)acrylate; diesterified products of acid anhydride group-containing unsaturated compounds such as maleic anhydride and itaconic anhydride, with glycols such as ethylene glycol, 1,6-hexanediol and neopentyl glycol; hydroxyalkylvinyl ethers such as hydroxyethylvinyl ether; allyl alcohol; 2-hydroxypropyl (meth)acrylate; adducts of α,β-unsaturated carboxylic acid with monoepoxy compound such as Cardura E10 (tradename, Shell Petrochemical Co.) and α-olefin epoxide; adducts of glycidyl (meth)acrylate with monobasic acid such as acetic acid, propionic acid, p-tert-butylbenzoic acid and fatty acids; and adducts of above-named hydroxyl group-containing monomers with lactones (e.g., ε-caproloctone, γ-valerolactone).

The term "(meth)acrylate" as used in this specification means acrylate or methacrylate; and "(meth)acrylic acid" means acrylic acid or methacrylic acid.

Specific examples of (meth)acrylic acid ester include $C_{1-24}$ alkyl esters or cycloalkyl esters of acrylic acid or methacrylic acid such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, cyclohexyl methacrylate, 2-ethylhexyl methacrylate, octyl methacrylate, decyl methacrylate, laulyl methacrylate and stearyl methacrylate; $C_{2-18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; and aromatic ring-containing (meth)acrylates such as phenyl (meth)acrylate, phenylethyl (meth)acrylate, phenylpropyl (meth)acrylate, benzyl (meth) acrylate and phenoxyethyl (meth)acrylate.

Examples of vinyl ether and allyl ether include chain alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether and octyl vinyl ether; cycloalkyl vinyl ethers such as cyclopentyl vinyl ether and cyclohexyl vinyl ether; aryl vinyl ethers such as phenyl vinyl ether and tolyl vinyl ether; aralkyl vinyl ethers such as benzyl vinyl ether and phenethyl vinyl ether; and allyl ethers such as allyl glycidyl ether and allyl ethyl ether.

Examples of olefin compound and diene compound include ethylene, propylene, butylene, vinyl chloride, butadiene, isoprene and chloroprene.

Examples of hydrocarbon ring-containing vinyl monomer include styrene, α-methylstyrene and vinyltoluene.

Examples of nitrogen-containing vinyl monomer include nitrogen-containing alkyl (meth)acrylate such as N,N-dimethylaminoethyl (meth)acrylate, N,N-diethylaminoethyl (meth)acrylate and N-tert-butylaminoethyl (meth)acrylate; polymerizable amides such as acrylamide, methacrylamide, N-methyl (meth)acrylamide, N-ethyl (meth)acrylamide, N,N-dimethyl (meth)acrylamide, N,N-dimethylaminopropyl (meth)acrylamide and N,N-dimethylaminoethyl (meth)acrylamide; aromatic nitrogen-containing monomers such as 2-vinylpyridine, 1-vinyl-2-pyrrolidone and 4-vinylpyridine; polymerizable nitriles such as acrylonitrile and methacrylonitrile; and allylamine.

The copolymerization of these vinyl monomers can be carried out by vinyl monomer polymerization methods in general, while solution type radical polymerization method in organic solvent is the most suitable, in consideration of universal use and cost. For example, it can be carried out in a solvent such as aromatic solvent, e.g., xylene, toluene; ketone solvent, e.g., methyl ethyl ketone, methyl isobutyl ketone; ester solvent, e.g., ethyl acetate, butyl acetate, isobutyl acetate, 3-methoxybutyl acetate; or alcoholic solvent, e.g., n-butanol, isopropyl alcohol; in the presence of a polymerization initiator such as azobisisobutyronitrile, benzoyl peroxide or the like, at temperatures ranging about 60-about 150° C. Whereby an intended polymer can be easily obtained.

Where a half-ester group-containing vinyl monomer or acid anhydride group-containing vinyl monomer is used in the preparation of vinyl type polycarboxylic acid resin, it is generally adequate to use the half-ester group-containing vinyl monomer or acid anhydride group-containing vinyl monomer and other vinyl monomer(s) at the following ratios based on the combined amount of all the monomers: the half-ester group-containing vinyl monomer or acid anhydride group-containing vinyl monomer, within a range of 5-40 mass %, in particular, 10-30 mass %, from the viewpoints of curability and storage stability; and other vinyl monomer(s), 60-95 mass %, in particular, 70-90 mass %. When an acid anhydride group-containing vinyl monomer is used, half-esterification reaction can be carried out after the copolymerization reaction.

The vinyl type polycarboxylic acid resin preferably has a number-average molecular weight within a range of 1,000-10,000 in general, in particular, 2,000-8,000, inter alia, 3,000-7,000. When number-average molecular weight is less than 1,000, acid resistance of the cured coating film may be reduced. Conversely, when it exceeds 10,000, the coating film may have degraded finished appearance due to decrease in compatibility with polyepoxide (B).

In the present specification, number-average molecular weight is a value calculated from a chromatogram measured with gel permeation chromatograph, based on the molecular weight of standard polystyrene. It can be measured using as the gel permeation chromatograph HLC8120GPC (tradename, Tosoh Corporation) and four columns of TSKgel G-4000HXL, TSKgel G-3000HXL, TSKgel G-2500-HXL and TSKgel G-2000HXL(tradenames, Tosoh Corporation), under the conditions of mobile phase; tetrahydrofuran, measuring temperature; 40° C., flow rate; 1 cc/min. and detector; RI.

Preferably the vinyl type polycarboxylic acid resin has an acid value within a range of generally 50-500 mgKOH/g, in particular, 80-300 mgKOH/g, inter alia, 100-250 mgKOH/g. When acid value of the vinyl type polycarboxylic acid resin is less than 50 mgKOH/g, the resulting paint composition may have lowered curability leading to less acid resistance of the coating film, and when the acid value is more than 500 mgKOH/g, the resin's compatibility with polyepoxide (B) may decrease to impair finished appearance of the coating film.

The polyester type polycarboxylic acid resin include esters of polybasic acids with polyhydric alcohols. Examples of the polybasic acid include phthalic acid (anhydride), isophthalic acid, terephthalic acid, succinic acid (anhydride), adipic acid, fumaric acid, maleic acid (anhydride), tetrahydrophthalic acid (anhydride), hexahydrophthalic acid (anhydride), trimellitic acid (anhydride), methylcyclohexene-tricarboxylic acid and pyromellitic acid (anhydride). Examples of polyhydric alcohol include ethylene glycol, propylene glycol, butylene glycol, diethylene glycol, butanediol, neopentyl glycol, cyclohexanedimethanol, 1,6-hexanediol, 2-butyl-2-ethyl-1,3-propanediol, 3-methyl-1,5-pentanediol, glycerine, trimethylolethane, trimethylolpropane, pentaerythritol, bis(hydroxyethyl)terephthalate, (hydrogenated) bisphenol, polyisocyanate polyol and triethanolamine.

Such polyester type polycarboxylic acid resin is obtainable, for example, through single stage reaction of polybasic acid with polyhydric alcohol under excessive presence of carboxyl groups of polybasic acid. Conversely, it can also be obtained by first synthesizing hydroxyl group-terminated polyester polymer under excessive presence of hydroxyl groups of the polyhydric alcohol, and then adding thereto acid anhydride group-containing compound such as phthalic anhydride, hexahydrophthalic anhydride, succinic anhydride or the like.

The polyester type polycarboxylic acid resin preferably has a number-average molecular weight generally ranging from 500-10,000, in particular, 650-7,500, inter alia, 800-5,000, from the viewpoint of finished appearance of the coating film.

It is also preferred for the polyester type polycarboxylic acid resin to have an acid value generally within a range of 50-500 mgKOH/g, in particular, 80-300 mgKOH/g, inter alia, 100-250 mgKOH/g. Where the acid value of the polyester type polycarboxylic acid resin is less than 50 mgKOH/g, the resulting paint composition shows lowered curability which may reduce acid resistance of the coating film, and where the acid value is more than 500 mgKOH/g, the resin's compatibility with polyepoxide (B) may decrease to impair finished appearance of the coating film.

Hydroxyl group may be introduced into the polyester type polycarboxylic acid resin for improving the resin's compatibility with polyepoxide (B) and adherability. Introduction of hydroxyl group can be effected by, for example, suspending the condensation reaction halfway, under the aforesaid condition of carboxyl group's excess. Conversely, under the condition of hydroxyl group's excess, the introduction can be easily effected by suspending the condensation reaction halfway, or by first synthesizing hydroxyl-terminated polyester polymer and thereafter adding an acid anhydride group-containing compound to be post-added, in an amount such that the acid groups should become less than the hydroxyl groups.

As the polyester type polycarboxylic acid resin, the particularly preferred are carboxyl group-containing, high acid value polyester resins obtained by subjecting polyhydric alcohol, for example, ethylene glycol, butylene glycol 1,6-hexanediol, trimethylolpropane or pentaerythritol, to an esterification reaction (which may be either of condensation reaction or ester-interchange reaction) with polyvalent carboxylic acid, for example, adipic acid, sebacic acid, terephthalic acid, isophthalic acid, phthalic anhydride, hexahydrophthalic anhydride or trimellitic anhydride, or lower alkylation products of these polyvalent carboxylic acids, under a condition rendering the amount of the hydroxyl groups in excess of the amount of the carboxyl groups (a mol of acid anhydride group being calculated as 2 mols of carboxyl group); and subjecting the resulting polyester polyol to half-esterification reaction with acid anhydride compound such as phthalic anhydride, hexahydrophthalic anhydride, succinic anhydride or trimellitic anhydride.

Preferably the above polyester polyol has a number-average molecular weight within a range of generally 350-4,700, in particular, 400-3,000; and a hydroxyl value within a range of generally 70-400 mgKOH/g, in particular, 150-350 mgKOH/g.

The half-esterification reaction of the polyester polyol for obtaining the carboxyl group-containing, high acid value polyester resin can be carried out following accepted practice, for example, at temperatures of room temperature to about 80° C. Thus obtained carboxyl group-containing high acid value polyester resin preferably has a number-average molecular weight within a range of generally 800-5,000, in particular, 900-3,000; and an acid value within a range of generally 50-500 mgKOH/g, in particular, 100-400 mgKOH/g.

Examples of the cyclic acid anhydride compound (A-2) include 1,2-carboxylic anhydrides such as maleic anhydride, succinic anhydride, dodecylsuccinic anhydride, tetrahydrophthalic anhydride, 3-methyltetrahydrophthalic anhydride, hexahydrophthalic anhydride, 3-methylhexahydrophthalic anhydride, Himic acid® anhydride, Het acid anhydride, phthalic anhydride and the like; and (co)polymers formed by radical polymerization of aforesaid acid anhydride group-containing vinyl monomers, and, where necessary, other vinyl monomers as above described.

Also examples of carboxyl group-containing cyclic acid anhydride compound (A-3) include compounds such as trimellitic anhydride; and copolymers formed by radical polymerization of aforesaid carboxyl group-containing vinyl monomers, acid anhydride group-containing vinyl monomers and, where necessary, still other vinyl monomers.

Polyepoxide (B)

Polyepoxide (B) used as a coating film-forming resin component in the clear coat paint of this invention is a resin having at least two epoxy groups, on an average, per molecule. As the polyepoxide, those per se known can be used, while acrylic resins having, on an average, 2-50 epoxy groups per molecule are preferred, from the viewpoint of obtaining cured coating film of excellent performances of finished appearance, weatherability, acid resistance and the like.

Such acrylic resins can be synthesized, for example, by copolymerization of epoxy group-containing vinyl monomers and other vinyl monomers, by the method similar to those described in respect of the carboxy group- and/or cyclic acid anhydride group-containing compound (A).

Examples of the epoxy group-containing vinyl monomer include glycidyl (meth)acrylate, allyl glycidyl ether and 3,4-epoxycyclohexylmethyl (meth)acrylate, and as other vinyl monomer, those earlier named as examples in respect of the carboxy group- and/or cyclic acid anhydride group-containing compound (A) can be used.

Hydroxyl groups may also be introduced into the polyepoxide (B) to make its hydroxyl value not higher than 100 mgKOH/g, for improving its compatibility with carboxyl group- and/or cyclic acid anhydride-containing compound (A) and adherability of the coating film formed of the paint. The introduction of hydroxyl groups can be done by, for example, carrying out the copolymerization using a hydroxyl group-containing vinyl monomer as a constituent component. As such hydroxyl group-containing vinyl monomer, those exemplified in respect of the carboxyl group- and/or cyclic acid anhydride group-containing compound (A) can be used.

The amount of use of the epoxy group-containing vinyl monomer preferably lies within a range of normally 5-60 mass %, in particular, 10-45 mass %, based on the combined amount of all the monomers, from the viewpoint of curability and storage stability of resulting clear coat paint. The amount of use of other vinyl monomer preferably lies normally within a range of 40-95 mass %, in particular, 55-90 mass %, based on the combined amount of all the monomers.

The polyepoxide (B) preferably has an epoxy group content within a range of normally 0.5-5.0 millimols/g, in particular, 0.8-3.5 millimols/g, inter alia, 1.0-3.0 millimols/g. When the epoxy group content of polyepoxide (B) is less than 0.5 millimol/g, curability of the resulting clear coat paint drops and may invite degradation in the coating film performance such as acid resistance. Conversely, when the epoxy group content becomes more than 5.0 millimols/g, compatibility of the polyepoxide (B) with the compound (A) may decrease.

The polyoxide (B) furthermore preferably has a number-average molecular weight within a range of generally 1,000-20,000, in particular, 1,100-15,000, inter alia, 1,200-10,000. Where the number-average molecular weight of the polyepoxide (B) is less than 1,000, acid resistance of cured coating film deteriorates in occasions. Conversely, when it exceeds 20,000, surface smoothness of resulting coating film deteriorates in occasions.

The preferred blend ratio of carboxyl group- and/or cyclic acid anhydride group-containing compound (A) and polyepoxide (B) in the clear coat paint used in the present method is, in terms of the equivalent ratio of the carboxyl groups in the former compound (A) to the epoxy group in the latter polyepoxide (B), generally within a range of 2:1-1:2, in particular, 1.75:1-1:1.75, inter alia, 1.5:1-1:1.5.

Organic Solvent (C)

The organic solvent (C) to be used in the clear coat paint following the present method has a boiling paint at 240° C.-300° C., preferably 250° C.-290° C., inter alia, 255° C.-285° C.; and a solubility in water not higher than 20, preferably not higher than 10, inter alia, not higher than 5. So long as these boiling point and solubility requirements are satisfied, any organic solvent can be used without particular limitation.

In the present specification, "solubility in water" is the numerical value expressed by the unit of gram of the mass of an organic solvent soluble in 100 g of water at 20° C.

When the organic solvent (C) used has a boiling point lower than 240° C., foaming resistance of the coating film may become insufficient. Conversely, when it exceeds 300° C., the coating film may have unsatisfactory sagging resistance. Again, when the organic solvent (C) has a solubility in water exceeding 20, due to the drop in volume specific resistance of the clear coat paint, electrostatic coatability may become defective.

The clear coat paint can contain the organic solvent (C) within a range of 2-20 mass %, in particular, 5-20 mass %, inter alia, 10-20 mass %, based on the combined amount of the carboxyl group- and/or cyclic acid anhydride group-containing compound (A) and polyepoxide (B). When the content of the organic solvent (C) is less than 2 mass % of the total amount of the carboxyl group- and/or cyclic acid anhydride group-containing compound (A) and polyepoxide (B), the coating film may have insufficient foaming resistance and, conversely, when it exceeds 20 mass %, sagging resistance of the coating film may become insufficient.

Examples of the organic solvent (C) include alcohols such as isotridecanol (boiling point 252° C., solubility not more than 0.01); diols such as 2-ethyl-1,3-hexanediol (boiling point 244.2° C., solubility 0.6); glycol ethers such as ethylene glycol monophenyl ether (boiling point 245° C., solubility 2.6), propylene glycol monophenyl ether (boiling point 243° C., solubility 1), diethylene glycol monohexyl ether (boiling point 260.0° C., solubility 1.7), diethylene glycol mono-2-ethylhexyl ether (boiling point 277.0° C., solubility 0.2), tripropylene glycol mono-n-butyl ether (boiling point 274° C., solubility 3), and diethylene glycol dibutyl ether (boiling point 256° C., solubility 0.3); and glycol ether-type esters such as diethylene glycol monobutyl ether acetate (boiling point 246.7° C., solubility 6.5) and 2,2,4-trimethyl-1,3-pentanediol monoisobutyrate (boiling point 253° C., water-insoluble). Of those, glycol ethers are particularly preferred. These organic solvents (C) can be used either alone or in combination of two or more.

Curing Catalyst (D)

Normally curing catalyst (D) is blended with the clear coat paint used in the present method, from the viewpoint of curability. As the curing catalyst (D), for example, onium salt (D-1), tertiary amine (D-2) and latent curing catalyst (D-3), which are conventionally used in esterification reaction of an acid with epoxide, can be named.

Onium salt (D-1) is a compound containing a lone pair such as nitrogen, phosphor, sulfur and the like, in which the lone pair is coordination bonded with proton or other cationic compound. As specific examples, quaternary ammonium salts represented by a general formula (I): $(R_1R_2R_3R_4N)X$, quaternary phosphonium salts represented by a general formula (II): $(R_1R_2R_3R_4P)X$, and tertiary sulfonium salts represented by a general formula (III): $(R_1R_2R_3S)X$ can be named, wherein $R_1$, $R_2$, $R_3$ and $R_4$ each stands for a hydrocarbon group, which may be the same or different, and those hydrogen atoms in the hydrocarbon groups are optionally substituted with halogen atoms or hydroxyl groups. Examples of the hydrocarbon group include straight or branched chain alkyl (e.g., $C_{1-20}$ alkyl groups such as methyl, ethyl, propyl, butyl, pentyl, octyl, stearyl and the like), cycloalkyl (e.g., $C_{5-10}$ cycloalkyl groups such as cyclopentyl, cyclohexyl, cycloheptyl and the like), aryl (e.g., phenyl, tolyl and the like) and aralkyl (e.g., benzyl group and the like). The X can be, for example, acid group or hydroxyl group of inorganic acid such as hydrochloric acid, sulfuric acid and phosphoric acid; and of organic acid such as acetic acid, citric acid, butyric acid, malonic acid, chlorinated acetic acid and the like.

Specific examples of the onium salt (D-1) include tetraethylammonium chloride, tetraethylammonium bromide, tetrabutylammonium chloride, tetrabutylammonium bromide, diethyldibutylammonium bromide, dimethyldioleylammonium chloride, dimethylbenzyllaurylammonium chloride, dimethyldicyclohexylammonium bromide, tetraethylphosphoniuim chloride, tetraethylphosphonium bromide, tetrabutylphosphonium chloride, dimethylbenzyllaurylphosphoniuim bromide and triethylsulfonium chloride.

The tertiary amine (D-2) is a compound represented by a general formula, $(R_1R_2R_3N)$, wherein $R_1$, $R_2$ and $R_3$ may be the same or different and each stands for a hydrocarbon group, the hydrogen atom(s) in the hydrocarbon group(s) being optionally substituted with halogen or hydroxyl group. Examples of the hydrocarbon group include straight or branched chain alkyl (e.g., $C_{1-20}$ alkyl such as methyl, ethyl, propyl, butyl, pentyl, octyl and stearyl); cycloalkyl (e.g., $C_{5-10}$ cycloalkyl such as cyclopentyl, cyclohexyl and cycloheptyl); aryl (e.g., phenyl, tolyl); and aralkyl (e.g., benzyl).

Specific examples of the tertiary amine (D-2) include trialkylamines such as trimethylamine, triethylamine, triisopropylamine, tri-n-propylamine, tri-n-butylamine, N,N-dimethylhexylamine, N,N-dimethyloctylamine, N,N-dimethyldecylamine, N,N-dimethyllaurylamine, N,N-dimethylmyristylamine, N,N-dimethylpalmitylamine, N,N-dimethylstearylamine, N,N-dimethylbehenylamine, N,N-dimethylcocoalkylamine, N,N-dimethyloleylamine, N-methyldihexylamine, N-methyldioctylamine, N-methyldidecylamine, N-methyldicocoalkylamine, and N-methyldioleylamine; trialkanolamines such as trimethanolamine and triethanolamine; N,N-dialkylalkanolamines such as N,N-dimethylethanolamine and N,N-diethylethanolamine; N-alkyldialkanolamines such as N-methyldiethanolamine and N-ethyldiethanolamine; and N-alkylmorpholines such as N-methylmorpholine and N-ethylmorpholine. These can be used either alone or in combination of two or more.

As the curing catalyst in the clear coat paint following the present invention, use of a latent curing catalyst (D-3) constituted of tertiary amine (a) and acidic phosphoric acid ester (b) is preferred, from the viewpoint of preventing lowering in electrostatic coatability due to reduction in electric resistance of the clear coat paint and improving storability of the paint. In the latent curing catalyst (D-3), tertiary amine (a) and acidic phosphoric acid ester (b) may be in the form of either a mixture or a reaction product.

As the tertiary amine (a), those exemplified as to the tertiary amine (D-2) can be similarly used. In particular, from the viewpoint of inhibiting reduction in electric resistance of the clear coat paint, to improve storability while maintaining curability of the paint, the tertiary amines of the general formula: $(R_1R_2R_3N)$, in which at least one of $R_1$, $R_2$ and $R_3$ is a hydrocarbon group containing at least 8, in particular, at least 12, inter alia, at least 16, carbon atoms can be preferably used. In particular, methyldialkyl tertiary amines and dimethylalkyl tertiary amines whose alkyl moiety contains at least 8 carbon atoms are preferred, the former methyldialkyl tertiary amines being the most preferred.

As such methyldialkyl tertiary amines, for example, N-methyldioctylamine, N-methyldidecylamine, N-methyldilaurylamine, N-methyldimyristylamine, N-methyldipalmitylamine, N-methyldistearylamine, N-methyldioleylamine, N-methyldibehenylamine, N-methyldicocoalkylamine, and N-methyl-hardened beef tallow alkylamine can be named. Of these methyldialkyl tertiary amine s, N-methyldicocoalkylamine and N-methyl-hardened beef tallow alkylamine can be conveniently used.

As dimethylalkyl tertrary amines, for example, N,N-dimethyloctylamine, N,N-dimethyldecylamine, N,N-dimethylaurylamine, N,N-dimethylmyristylamine, N,N-dimethylpalmitylamine, N,N-dimethylstearylamine, N,N-dimethyloleylamine, N,N-dimethylbehenylamine, N,N-dimethylcocoalkylamine and N,N-dimethyl-hardened beef tallow alkylamine can be named. Of these dimethylalkyl tertiary amines, N,N-dimethylcocoalkylamine and N,N-dimethyl-hardened beef tallow alkylamine are the preferred.

The acidic phosphoric acid ester (b) includes organic acidic phosphoric (phosphorous) acid esters formed by substituting a part of hydrogen atoms in inorganic phosphorus compound such as phosphoric acid, phosphorous acid or condensates thereof, with linear or branched alkyl group (e.g., methyl, ethyl, n-propyl, iso-propyl, n-butyl, iso-butyl, sec-butyl, tert-butyl, n-pentyl, n-hexyl, n-heptyl, 2-ethylhexyl and n-decyl) or aryl group (e.g., phenyl and tolyl). Specifically, for example, dimethyl phosphate, diethyl phosphate, dipropyl phosphate, monobutyl phosphate, dibutyl phosphate, mono-2-ethylhexyl phosphate, bis(ethylhexyl) phosphate, monophenyl phosphate, diphenyl phosphate and mono-2-ethylhexyl phosphite can be named. Of these, diphenyl phosphate is particularly preferred.

The blend ratio of the tertiary amine (a) to the acidic phosphoric acid ester (b) is, based on the combined amount of these two components, the tertiary amine (a) can be within a range of generally 2-90 mass %, preferably 25-75 mass %; and the acidic phosphoric acid ester (b), within a range of normally 10-98 mass %, preferably 25-75 mass % When the blend ratio of the tertiary amine (a) is less than 2 mass %, low temperature curability of the paint composition may drop. On the other hand, when the blended amount of the tertiary amine (a) is more than 90 mass %, storage stability of the paint composition may be impaired.

As preferred combination of tertiary amine (a) and acidic phosphoric acid ester (b) in the latent curing catalyst (D-3), those between methyldialkyl tertiary amine or dimethylalkyl tertiary amine whose alkyl group has 8-24 carbon atoms and diphenyl phosphate or bis(ethylhexyl)phosphate can be named.

The blend amount of the latent curing catalyst (D) per 100 mass parts of the sum of the carboxyl group- and/or cyclic acid anhydride group-containing compound (A) and polyepoxide (B) preferably lies within a range of generally 0.1-10 mass parts, in particular, 0.5-8 mass parts. When the blend ratio of the curing catalyst is less than 0.1 mass part per 100 mass parts of the sum of the carboxyl group- and/or cyclic acid anhydride group-containing compound (A) and polyepoxide (B), sufficient curability of the coating film may not be obtained. Conversely, when it exceeds 10 mass parts, storage stability may deteriorate.

Other Additives

Where necessary, so-called dehydrator such as trimethyl orthoacetate may be blended in the clear coat paint, for suppressing degradation of the paint caused by moisture present in the paint or in the air.

The clear coat paint may also be blended with pigments such as coloring pigment, extender, effect pigment and the like, in an amount as will not interfere with transparency. Specific examples of the pigment include coloring pigments such as titanium dioxide, zinc flower, Carbon Black, Cadmium Red, Molybdate Red, chrome yellow, chromium oxide, Prussian blue, Cobalt Blue, azo pigment, phthalocyanine pigment, quinacridone pigment, isoindoline pigment, vat pigment and perylene pigment; extenders such as talc, clay, kaoline, baryta, barium sulfate, barium carbonate, calcium carbonate, silica and alumina white; and effect pigments such as aluminum powder, mica powder and titanium dioxide-coated mica powder.

The clear coat paint can further contain, where necessary, various resin(s) other than the carboxyl group- and/or cyclic acid anhydride group-containing compound (A) and polyepoxide (B), such as acrylic resin, polyester resin, alkyd resin, silicone resin and fluorinated resin. It is also possible to concurrently use a minor amount of a crosslinking agent such as melamine resin blocked polyisocyanate compound or the like. Furthermore, the clear coat paint can further contain, where necessary, paint additives in general, such as UV absorber, light stabilizer, antioxidant, surface regulating agent, defoamer and the like.

As the UV absorber, those known per se can be used, e.g., benzotriazole-type absorber, triazine-type absorober, salicylic acid derivative-type absorber or benzophenone-type absorber. Preferred content of such a UV absorber in the clear coat paint in respect of weatherability and yellowing resistance is, per 100 mass parts of the total solid resin content, within a range of normally 0-10 mass parts, in particular, 0.2-5 mass parts, inter alia, 0.3-2 mass parts.

As the light stabilizer, those known per se can be used, as examples of which hindered amine type light stabilizers can be named. Preferred content of such a light stabilizer in the clear coat paint in respect of weatherability and yellowing resistance is, per 100 mass parts of the total solid resin content, within a range of normally 0-10 mass parts, in particular, 0.2-5 mass parts, inter alia, 0.3-2 mass parts.

The form of the clear coat paint is not particularly limited, but organic solvent-based type is normally preferred. As the organic solvent useful for organic solvent-based type paint compositions, the organic solvent (C) or mixtures of the organic solvent (C) with other organic solvents can be used. Examples of other organic solvents include aromatic or aliphatic hydrocarbon solvents; alcoholic solvents; ester solvents; ketone solvents; and ether solvents (excepting those belonging to the organic solvent (C)) can be named. More specifically, for example, toluene, xylene, SOLVESSO 150 (tradename, Exxon Mobile Chemical Co.), SWAZOL 310, SWAZOL 1000, SWAZOL 1500 (tradename, Maruzen Petrochemical Co.) and the like can be named. The organic solvents used may be those as used at the preparation time of the carboxyl group- and/or cyclic acid anhydride group-containing compound (A) and polyepoxide (B), or they may be suitably added. The solid concentration in the paint composition may be within a range of usually about 30-about 70 mass %, preferably about 40-about 60 mass %.

Base Coat Paint

The base coat paint, which is used in the present method, is a paint for forming a base coating film constituting the multilayer film together with the clear coating film. Specifically, solid color paint, metallic paint and iridescent paint can be named. In particular, liquid thermosetting paint comprising a resin component, pigment and, where necessary, organic solvent or water which is a volatile component is suitable.

Specific examples of the resin component include those composed of at least one base resin selected from acrylic resin, vinyl resin, polyester resin, alkyd resin, urethane resin, polyether resin, polyolefin resin and the like which have crosslinkable functional groups (e.g., hydroxyl, epoxy, carboxyl or alkoxysilyl groups), and a crosslinking agent to crosslink and cure those resins, for example, at least one selected from known crosslinking agents for use in the field of paint, e.g., alkyletherified melamine resin, urea resin, guanamine resin, optionally blocked polyisocyanate compound, epoxy compound, carboxyl group-containing compound, aziridine compound, carbodiimide compound, oxazoline compound and the like. As the base resin, acrylic resin and polyester resin are preferred from the viewpoint of coating film performance such as weatherability and water resistance, and as the crosslinking agent, amino resin and blocked polyisocyanate compound are preferred from the viewpoint of coating film performance and cost. It is preferred to use the base resin and the crosslinking agent at such a ratio, based on their combined mass, within a range of 50-90 mass %, in particular, 60-80 mass % of the base resin; and 10-50 mass %, in particular, 20-40 mass % of the crosslinking agent.

Use of high solid paint or water-based paint of low organic solvent content as the base coat paint is preferred from the viewpoint of environmental problems and resource saving.

The pigment includes coloring pigment, metallic pigment, iridescent pigment and extender pigment. Examples of coloring pigment include inorganic pigments such as titanium dioxide, zinc flower, yellow iron oxide, red iron oxide, Carbon Black, Cadmium Red, Molybdate Red, chrome yellow, chromium oxide, Prussian Blue and Cobalt Blue; and organic pigments such as azo pigment, diketopyrrolopyrrole pigment, benzimidazolone pigment, phthalocyanine pigment, quinacridone pigment, isoindoline pigment, isoindolinone pigment, vat pigment, perylene pigment, perinone pigment, indigo pigment, dioxane pigment and metal complex pigment. As typical examples of metallic pigment, uncolored or colored metallic effect agents such as aluminum, aluminum oxide, copper, zinc, iron, nickel, tin and the like and alloys can be named, also including special vapor-deposited metallic film flakes. As iridescent pigment, for example, mica, mica with metal oxide-coated surface, micaceous iron oxide, graphite pigment, hologram pigment and the like can be named. Furthermore, as extender pigment, for example, calcium carbonate, barium sulfate, clay, talc and the like can be named. These pigments can be used either alone or in combination of two or more.

Shape of above metallic pigment and iridescent pigment is subject to no particular limitation. They may also be colored. For example, those having an average particle diameter (D50) of 2-50 μm and a thickness of 0.1-5 μm are preferred. Again, those having an average particle size ranging 10-35 μm excel in brightness and are used with still higher preference.

The pigment concentration in the base coat paint is preferably within a range of generally 0.1-150 mass %, in particular, 0.5-100 mass %, inter alia, 1-50 mass %, based on the total solid content of the resin component.

It is furthermore preferred to add a rheology-controlling agent to the base coat paint, from the viewpoint of coating workability. Rheology-controlling agent is used for favorably forming unevenness- and sagging-free coating film, and generally those exhibiting thixotropic property can be used for this purpose.

The base coat paint can be blended with, besides the above components, additives customarily added to paint, such as surface regulating agent, thickener, antioxidant, ultraviolet shading agent, defoaming agent and the like.

The solid concentration of the base coat paint at the application time can be normally 10-60 mass %, preferably 15-50 mass %. When the solid concentration exceeds 60 mass %, the coating film may have degraded appearance due to the high viscosity of the paint. Conversely, when it is lower than 10 mass %, the low viscosity may invite faulty appearance such as unevenness.

Multilayer Coating Film-Forming Method

The multilayer coating film-forming method of the present invention comprises applying a base coat paint onto a coating object to form a base coating film, applying a clear coat paint onto the so formed uncured base coating film to form a clear coating film, and heating and curing the base coating film and clear coating film simultaneously, which method is characterized in that the above-described clear coat paint is applied as the clear coat paint.

Coating Objects

Objects to which the present method is applicable are subject to no particular limitation which can be, for example, metal substrates such as sheet steel, e.g., cold-rolled sheet steel, zinc-plated sheet steel, zinc alloy-plated sheet steel, stainless sheet steel and tin-plated sheet steel, aluminum sheet, aluminum alloy sheet and the like; and various plastic materials. They may also be bodies of various vehicles made of those materials, such as automobiles, two-wheelers, container cars and the like.

Above coating objects may be metallic surfaces of the metallic substrates or of car bodies, on which surface treatment such as phosphate treatment, chromate treatment, complex oxide treatment or the like has been given.

The coating objects can furthermore be such car bodies or metallic substrates on which under coating film such as of various electrodeposition paints and/or intermediate coating film are formed, or a coloring paint or the like may be further applied onto the intermediate coat-applied surface, to form a colored coating film.

Application of Base Coat Paint

According to the present method, first a base coat paint is applied onto such a coating object. Application of the base coat paint can be carried out, for example, by applying a base coat paint whose viscosity is adjusted to, for example, around 15-60 seconds, with Ford cup viscosimeter No. 4 at 20° C., by such coating method as airless spray, air spray or rotary atomizing application, onto a metallic and/or plastic coating object like an outer panel of an automobile, either directly or after applying an under coat paint like cationic electrodeposition paint or, depending on the occasion, further applying an intermediate coat paint to the coating object and curing the coating film(s). At the coating time, static electricity may be impressed where necessary.

After applying the base coat paint, pre-heating may be conducted, for example, at about 50-about 80° C. for around 3-10 minutes where necessary, for promoting volatilization of the volatile component, The applied film thickness of the base coat paint can be within a range of, in terms of cured film, normally about 5-about 50 μm, preferably about 10-about 30 μm.

Curing of the base coating film is conducted simultaneously with that of the clear coating film, normally by heating at temperatures of about 80-about 180° C., preferably about 100-about 160° C., for about 10-40 minutes, while differing depending on the kind of the resin component in the base coat paint.

Application of Clear Coat Paint

After application of the base coat paint, above-described clear coat paint is applied onto the uncured base coating film as formed in the above. Application of the clear coat paint can be carried out in the manner similar to that of base coat paint, for example, by air spray, airless spray, rotary atomizing coating, curtain flow coating and the like. These coating methods may be conducted under impression of static electricity. Of these, electrostatic rotary atomizing coating is preferred. The application amount of the clear coat paint preferably is such that makes its cured film thickness normally about 10-about 50 μm, in particular, about 15-about 40 μm.

Also at the application time of the clear coat paint, for example, by rotary atomizing coating under impression of static electricity, preferably the viscosity of the clear coat paint is suitably adjusted in advance with solvent such as an organic solvent, to fall in a viscosity range of about 15-60 seconds, as measured with Ford cup No. 4 viscosimeter at 20° C.

Heat-Curing of Multilayer Coating Film

After forming a clear coating film on the uncured base coating film (where necessary, after formation of the clear coating film, pre-heating at temperatures of, for example, about 50-about 80° C. for around 3-10 minutes may be conducted to promote volatilization of the volatile component), the base coating film and clear coating film are simultaneously cured by heating. The heating can be carried out by per se known means, for example, with drying oven such as hot air oven, electric oven, infrared induction heating oven and the like. Preferred heating temperature is within a range of normally about 80-about 180° C., in particular, about 100-about 160° C. The heating time is not particularly limited, but normally around 10-40 minutes is convenient.

EXAMPLES

Hereinafter the present invention is more specifically explained, referring to working Examples and Comparative Examples, it being understood that the invention is not limited to the following Examples. Hereafter "part" and "%" are invariably based on mass, and thickness of coating film invariably refers to cured coating film thickness.

Production Examples of Carboxyl Group-Containing Compound (A)

Production Example 1

A 4-necked flask equipped with a stirrer, thermometer, condenser tube and nitrogen gas inlet was charged with 680 parts of SWAZOL 1000 (tradename, COSMO OIL Co., Ltd, a hydrocarbon type organic solvent) whose temperature was elevated to 125° C. under passing of nitrogen gas. After it reached 125° C., the nitrogen gas supply was stopped, and into the flask a monomeric mixture composed of the following monomers, solvent and polymerization initiator was dropped at a uniform rate over 4 hours. In the following, p-tert-butylperoxy-2-ethylhexanoate is a polymerization initiator.

|  | parts |
| --- | --- |
| Styrene | 500 |
| Cyclohexyl methacrylate | 500 |
| Isobutyl methacrylate | 500 |
| Maleic anhydride | 500 |
| 2-Ethoxyethyl propionate | 1000 |
| p-tert-Butylperoxy-2-ethylhexanoate | 100 |

While passing nitrogen gas therethrough at 125° C., the content of the flask was aged for 30 minutes, followed by further dropwise addition of a mixture of 10 parts of p-tert-butylperoxy-2-ethyl-hexanoate and 80 parts of SWAZOL 1000 over an hour. Thereafter the reaction mixture was cooled to 60° C., and to which 490 parts of methanol and 4 parts of triethylamine were added, followed by 4 hours' half-esterification reaction under reflux. Thereafter 326 parts of superfluous methanol was removed under reduced pressure, to provide a solution of carboxyl group-containing compound (a-1).

Thus obtained polymer solution had a solid content of 55 mass % and number-average molecular weight of about 3500. Also the half acid value of this polymer was 130 mgKOH/g.

Production Example 2

A 4-necked flask equipped with a stirrer, thermometer, condenser tube and nitrogen gas inlet was charged with 650 parts of SWAZOL 1000 (tradename, COSMO OIL Co., Ltd, a hydrocarbon type organic solvent) whose temperature was elevated to 125° C. under passing of nitrogen gas. After it reached 125° C., the nitrogen gas supply was stopped, and into the flask a monomeric mixture composed of the following monomers, solvent and polymerization initiator was dropped at a uniform rate over 4 hours.

|  | parts |
| --- | --- |
| Methyl methacrylate | 40 |
| n-Butyl methacrylate | 1000 |
| n-Butyl acrylate | 600 |
| Styrene | 60 |
| Acrylic acid | 300 |
| 2-Ethoxyethyl propionate | 900 |
| p-tert-Butylperoxy-2-ethylhexanoaote | 100 |

While passing nitrogen gas therethrough at 125° C., the content of the flask was aged for 30 minutes, followed by further dropwise addition of a mixture of 10 parts of p-tert-butylperoxy-2-ethyl-hexanoate and 80 parts of SWAZOL 1000 over an hour. Aging the reaction mixture for additional 30 minutes, a solution of carboxyl group-containing compound (a-2) was obtained.

Thus obtained polymer solution had a solid content of 55 mass % and number-average molecular weight of about 3400. Also the acid value of this polymer was 117 mgKOH/g.

Production Example 3

A 4-necked flask equipped with a stirrer, thermometer, condenser tube and nitrogen gas inlet was charged with 566 parts of 1,6-hexanediol, 437 parts of trimethylolpropane, 467 parts of adipic acid and 308 parts of hexahydrophthalic anhydride, whose temperature was raised to 180° C. in nitrogen atmosphere. Thereafter the temperature was raised to 230° C. consuming 3 hours, and at said temperature the monomeric mixture was allowed to react for an hour. Xylene was added and the reaction was continued under reflux. Upon confirming that the resin acid value decreased to not higher than 3 mgKOH/g, the reaction system was cooled to 100° C., followed by addition of 1294 parts of hexahydrophthalic anhydride. The temperature was raised again to 140° C., and the reaction was further continued for 2 hours. After cooling, the reaction mixture was diluted with xylene to provide a solution of carboxyl group-containing compound (a-3).

Thus obtained polymer solution had a solid content of 65 mass % and number-average molecular weight of 1,040. Also the acid value of this polymer was 160 mgKOH/g.

Production Example of Polyepoxide (B)

Production Example 4

A 4-necked flask equipped with a stirrer, thermometer, condenser tube and nitrogen gas inlet was charged with 410 parts of xylene and 77 parts of n-butanol, whose temperature was raised to 125° C. under passing nitrogen gas. After it reached 125° C., the nitrogen gas supply was stopped, and into which a monomeric mixture composed of the following monomers and a polymerization initiator was dropped at a uniform rate over 4 hours. In the following, azobisisobutyronitrile is a polymerization initiator.

|  | parts |
| --- | --- |
| Glycidyl methacrylate | 432 (30%) |
| n-Butyl acrylate | 720 (50%) |
| Styrene | 288 (20%) |
| Azobisisobutyronitrile | 72 |

While passing nitrogen gas therethrough at 125° C., the content of the flask was aged for 30 minutes, followed by further dropwise addition of a mixture of 90 parts of xylene, 40 parts of n-butanol and 14.4 parts of azobisisobutyronitrile over 2 hours. Further aging the reaction mixture for additional 2 hours, a solution of polyepoxide (b-1) was obtained.

Thus obtained polymer solution had a solid content of 70 mass % and number-average molecular weight of 2000. The epoxy group content of this polymer was 2.12 millimols/g.

Production Examples of Clear Coat Paint

Production Examples 5-13 and Comparative Production Examples 1-7

Using the polymers as obtained in the above Production Examples 1-4 and the starting materials as shown in the later-appearing Table 1, compositions as identified in the same Table 1 were charged each in a container, stirred and mixed with rotary blade mixer to form a paint. Thus clear coat paint Nos. 1-16 were obtained. In the Table 1, the blend composition of each clear coat paint is shown by solid mass ratios of individual components (excepting organic solvent (C)).

In the later-appearing Table 1, (*1)-(*12) respectively mean the following.

(*1) ARMIN M2C: tradename, Lion Akzo Co., N-methyl-dicocoalkylamine (a tertiary amine, chief components: component with $C_{1-2}$ alkyl group (60%), component with $C_{1-4}$ alkyl group (22%), component with $C_{1-6}$ alkyl group (8%) and component with $C_{10}$ alkyl group (7%))

(*2) TBAB: tradename, Lion Akzo Co., tetrabutylammonium bromide (*3) phosphoric acid ester: diphenyl phosphate (*4) BYK-300: tradename, BYK Chemie GmbH, surface regulating agent (*5) organic solvent C-1: diethylene glycol mono-2-ethylhexyl ether (*6) organic solvent C-2: diethylene glycol monohexyl ether (*7) organic solvent C-3: 2-ethyl-1,3-hexanediol (*8) organic solvent C-4: tripropylene glycol mono-n-butyl ether (*9) organic solvent C-5: tripropylene glycol monomethyl ether (*10) organic solvent C-6: ethylene glycol mono-2-ethylhexyl ether (*11) organic solvent C-7: ethylene glycol monohexyl ether (*12) organic solvent C-8: tetraethylene glycol monobutyl ether The boiling point and solubility in water of each of the organic solvents C-1 to C-8 of (*5)-(*12) are shown in later appearing Table 2.

The viscosity of clear coat paint Nos. 1-16 as obtained in Production Examples 5-13 and Comparative Examples 1-7 was adjusted to 28 seconds as measured with Ford cup No. 4 at 20° C., by addition of SWAZOL 1000 (tradename, COSMO OIL Co., hydrocarbon solvent).

Using the resulting clear coat paints, the following measurements were made.

Electric resistance: Using those clear coat paints whose viscosity was adjusted as above as the test specimens, their volume specific resistance values were measured with Landsberg tester.

Storage stability: Separately, the same clear coat paints whose viscosity was adjusted to 35 seconds (20° C.) as measured with Ford cup No. 4 were prepared by addition of SWAZOL 1000 as the diluent, which were stored in sealed condition at 60° C. for 16 hours. Thereafter their viscosity was measured with Ford cup No. 4 (20° C.).

Furthermore, test panels were prepared with each of the clear coat paint Nos. 1-16 and given the following tests. The test panels were prepared as follows.

Formation of Multilayer Coating Film

Examples 1-9 and Comparative Examples 1-7

In the following tests, the coating object which was prepared as follows was used.

A zinc phosphated, 0.8 mm-thick dull steel plate was electrocoated with ELECRON 9600, (tradename, Kansai Paint Co. a thermosetting epoxy resin type cationic electrocoating paint) to a film thickness of 20 µm which was then cured by heating at 170° C. for 30 minutes. TP-65-2 (tradename, Kansai Paint Co. a polyester resin-melamine resin type intermediate paint for automobiles) was air spray coated thereon to a film thickness of 35 µm and cured by heating at 140° C. for 30 minutes. On this coating object, each multilayer coating film was formed in the manner as hereafter described, and its foaming resistance, coated surface smoothness and sagging limit film thickness were measured.

Foaming Resistance

On the intermediate coating film surface on the coated object of 11 cm×30 cm in size, a water-based base coat (WBC 713T #1E7, tradename, Kansai Paint Co., an acrylic-melamine resin type water-based base coat paint for automobiles, silver-colored) whose viscosity had been adjusted to 30 seconds as measured with Ford cup No. 4 (20° C.) was applied to a film thickness of 15 µm with a rotary atomizing electrostatic coater, at a discharge rate of 300 cc/min, rotation number of 25,000 rpm, shaping air pressure of 1.5 kg/cm$^2$, gun distance of 30 cm and booth temperature/humidity of 25° C./75%. Allowing the coated film to stand for 2 minutes, pre-heating was given thereto at 80° C. for 3 minutes. Then onto the uncured coated surface each of the viscosity-adjusted clear coat paint was applied to a film thickness of 40 µm with a minibell rotary atomizing electrostatic coater, at a discharge rate of 200 cc/min, rotation number of 40,000 rpm, shaping air pressure of 1 kg/cm$^2$, gun distance of 30 cm and booth temperature/humidity of 25° C./75%. After 3 minutes' standing, the multilayer coating film was simultaneously cured by heating at 140° C. for 30 minutes, to provide a test panel. Traces of bubbles formed by foaming on each of the test panels were visually observed and their foaming resistance was evaluated according to the number of bubble traces.

Coated Surface Smoothness

Test panels were prepared in the manner similar to those for the above foaming resistance test, except that the clear coat paint-applied panels were left standing for 10 minutes and then the 30 minutes' heating at 140° C. was initiated. As to each of thus obtained test panels, coated surface smoothness was evaluated by measuring Long Wave value (LW) and Short Wave value (SW) with Wave Scan (tradename, BYK Gardner Co.).

Long Wave value is an index of amplitude of surface roughness of the wavelength ranging 1.2-12 mm, and can evaluate large amplitude such as of, e.g., orange peel of coated film surface. Short Wave value is an index of amplitude of surface roughness of the wavelength ranging 0.3-1.2 mm, and can evaluate small amplitude of fine texture of coated film surface.

As to both of the Wave Scan values, less measured values indicate higher smoothness of the coated film surface.

Sagging Limit Film Thickness

Test panels were prepared in the manner similar to those for the foaming resistance test, except that the coated object of 11 cm×45 cm in size with 21 holes of each 5 mm in diameter punched at 2 cm-intervals in a line at 3 cm-distant from a side edge was used, the clear coat paint was applied with a film thickness gradient of approximately 30 µm-60 µm in the longitudinal direction, the so coated panels were vertically posted and the heating was started 7 minutes after the application of the clear coat paint. Sagging resistance was evaluated by determining the position at which sagging by 2 mm of the coating film from the punched holes in each of the test panel was observed and measuring the film thickness at that position (sagging limit film thickness (µm)). Greater sagging limit film thickness indicates better sagging resistance.

In the following Table 1, the test results of the foaming resistance, sagging resistance and coated surface smoothness are shown concurrently with the electric resistance and storage stability of each of the clear coat paints.

TABLE 1

|  | Example | | | | | | | | | Comparative Example | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 | 7 |
| Clear coat paint No. | 1 | 2 | 3 | 4 | 5 | 6 | 7 | 8 | 9 | 10 | 11 | 12 | 13 | 14 | 15 | 16 |
| Carboxyl group-containing compound (a-1) | 50 |  | 45 | 50 | 50 | 50 | 50 | 50 | 50 | 50 | 50 | 50 | 50 | 50 | 50 | 50 |
| Carboxyl group-containing compound (a-2) |  | 50 |  |  |  |  |  |  |  |  |  |  |  |  |  |  |
| Carboxyl group-containing compound (a-3) |  |  | 10 |  |  |  |  |  |  |  |  |  |  |  |  |  |
| Polyepoxide (b-1) | 50 | 50 | 45 | 50 | 50 | 50 | 50 | 50 | 50 | 50 | 50 | 50 | 50 | 50 | 50 | 50 |
| ARMIN M2C (*1) |  |  |  |  | 1.0 |  |  |  |  |  | 1.0 |  |  | 1.0 |  |  |
| TBAB (*2) |  |  |  |  |  |  |  | 1.0 |  |  |  | 1.0 |  |  |  |  |
| Phosphoric acid ester (*3) |  |  |  |  |  |  |  |  | 0.8 |  |  |  |  |  |  |  |
| BYK-300 (*4) |  |  |  |  |  |  |  |  | 0.1 |  |  |  |  |  |  |  |
| Organic solvent C-1 (*5) | 15 | 15 | 15 | 5 | 10 |  |  |  |  |  |  | 25 |  |  |  |  |
| Organic solvent C-2 (*6) |  |  |  |  |  | 15 |  |  |  |  |  |  |  |  |  |  |
| Organic solvent C-3 (*7) |  |  |  |  |  |  | 15 |  |  |  |  |  |  |  |  |  |
| Organic solvent C-4 (*8) |  |  |  |  |  |  |  | 15 |  |  |  |  |  |  |  |  |
| Organic solvent C-5 (*9) |  |  |  |  |  |  |  |  |  |  |  |  | 15 |  |  |  |
| Organic solvent C-6 (*10) |  |  |  |  |  |  |  |  |  |  |  |  |  | 15 |  |  |
| Organic solvent C-7 (*11) |  |  |  |  |  |  |  |  |  |  |  |  |  |  | 15 |  |
| Organic solvent C-8 (*12) |  |  |  |  |  |  |  |  |  |  |  |  |  |  |  | 15 |
| Foaming resistance (number of bubble traces) | 0 | 0 | 0 | 2 | 1 | 1 | 1 | 0 | 0 | 13 | 15 | 0 | 4 | 7 | 10 | 1 |
| Sagging resistance (sagging limit film thickness (μm)) | 44 | 43 | 42 | 45 | 44 | 44 | 44 | 42 | 43 | 45 | 44 | 38 | 44 | 44 | 44 | 39 |
| Coated surface smoothness (WAVE SCAN) LW | 4.5 | 4.4 | 4.2 | 4.6 | 4.7 | 4.6 | 4.7 | 4.4 | 4.6 | 4.8 | 5.0 | 4.2 | 4.7 | 4.8 | 4.8 | 4.1 |
| SW | 10.8 | 10.6 | 9.8 | 11.1 | 11.4 | 11.2 | 11.2 | 11 | 11.1 | 11.8 | 12.1 | 9.4 | 11.3 | 11.6 | 11.7 | 9.6 |
| Electric resistance (MΩ) | 2.5 | 2.5 | 2.5 | 2.6 | 2.5 | 2.3 | 2.5 | 2.4 | 0.40 | 2.6 | 0.48 | 2.6 | 2.3 | 2.4 | 2.4 | 2.3 |
| Storage resistance (sec/Fc #4) | 39 | 38 | 38 | 40 | 39 | 39 | 40 | 39 | 48 | 40 | 50 | 39 | 40 | 39 | 40 | 41 |

TABLE 2

| | Organic Solvent | | | | | | | |
| --- | --- | --- | --- | --- | --- | --- | --- | --- |
| | C-1 | C-2 | C-3 | C-4 | C-5 | C-6 | C-7 | C-8 |
| Boiling point (° C.) | 277.0 | 260.0 | 244.2 | 274 | 242 | 228.6 | 208.3 | 304 |
| Solubility in water | 0.2 | 1.7 | 0.6 | 3 | complete dissolution | 0.1 | 0.99 | complete dissolution |

The invention claimed is:

1. A multilayer coating film-forming method which comprises applying onto a coating object a base coat paint to form a base coating film, applying onto the formed uncured base coating film a clear coat paint to form a clear coating film, and heating the base coating film and clear coating film to cure the two films simultaneously, wherein the clear coat paint comprises a carboxyl group- and/or cyclic acid anhydride group-containing compound (A), polyepoxide (B) and an organic solvent (C) having a boiling point of 240° C. -300° C. and a solubility in water not higher than 20 g/100 g of water at 20° C. ,and in that the content of the organic solvent (C) is, based on the combined amount of the carboxyl group- and/or cyclic acid anhydride group-containing compound (A) and polyepoxide (B), 2-20 mass %, said clear coat paint further containing a latent curing catalyst (D) comprising tertiary amine (a) and acidic phosphoric acid ester (b), the tertiary amine (a) being a compound represented by a general formula, $(R_1R_2R_3N)$, wherein $R_1$ and $R_2$ and $R_3$ may be the same or different, at least one of which is a hydrocarbon group having at least 8 carbon atoms optionally substituted with halogen or hydroxyl group.

2. The method according to claim 1, in which the carboxyl group-and/or cyclic acid anhydride group-containing compound (A) is selected from the group consisting of polycarboxylic acid compound (A-1) containing at least two carboxyl groups per molecule, cyclic acid anhydride compound (A-2) containing at least one cyclic acid anhydride group per molecule, and carboxyl group-containing cyclic acid anhydride compound (A-3) containing at least one each of carboxyl group and cyclic acid anhydride group per molecule.

3. The method according to claim 1, in which the polyepoxide (B) is an acrylic resin having, on an average, 2 to 50 epoxy groups per molecule.

4. The method according to claim 1, in which the organic solvent (C) is glycol ether.

5. The method according to claim 1, in which the content of organic solvent (C) is 5- 20 mass %, based on the combined amount of the carboxyl group-and/or cyclic acid anhydride group-containing compound (A) and polyepoxide (B).

* * * * *